April 3, 1934.  C. F. REIS  1,953,131
MAGNETO ROTOR
Filed April 25, 1931   3 Sheets-Sheet 1
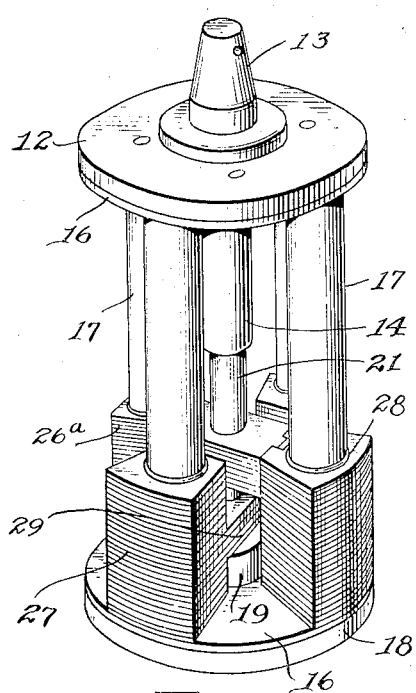
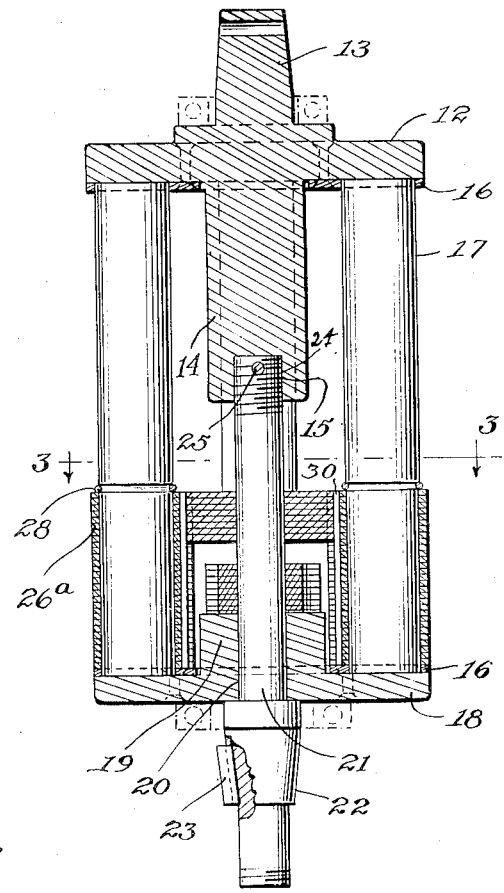
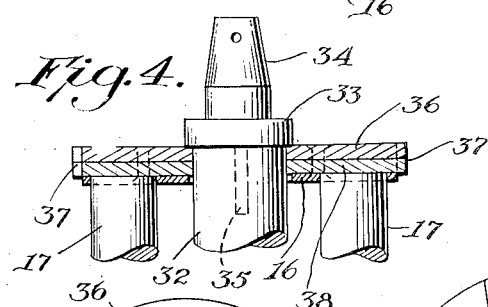
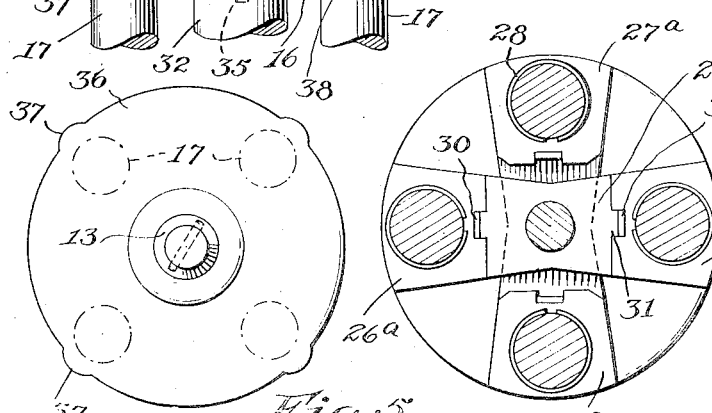
Inventor
Curt F. Reis
Eccleston & Eccleston
Attorneys April 3, 1934.　　　C. F. REIS　　　1,953,131
MAGNETO ROTOR
Filed April 25, 1931　　　3 Sheets-Sheet 2
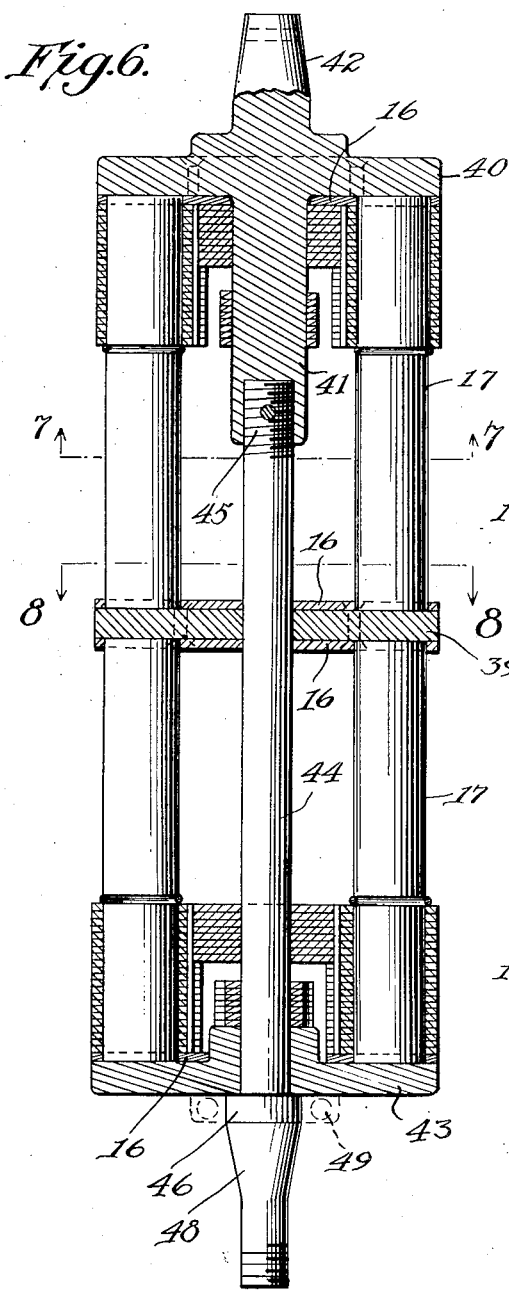
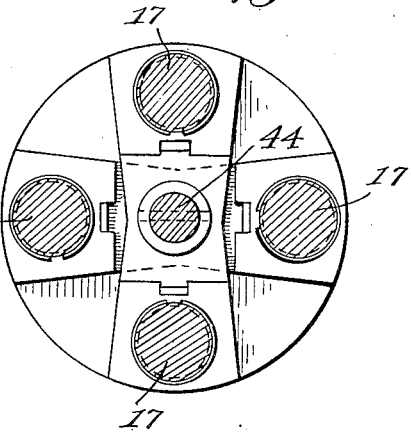
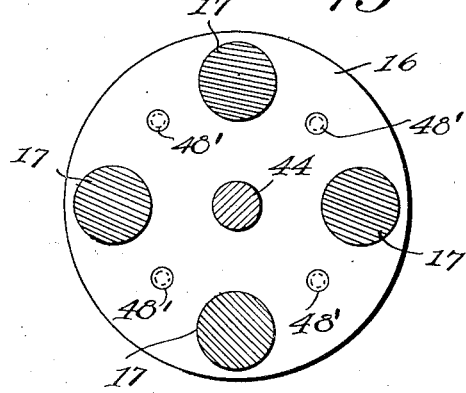
Inventor
Curt F. Reis
By Eccleston & Eccleston,
Attorneys April 3, 1934.  C. F. REIS  1,953,131
MAGNETO ROTOR
Filed April 25, 1931   3 Sheets-Sheet 3

Inventor
Curt F. Reis
Eccleston & Eccleston
Attorneys

Patented Apr. 3, 1934

1,953,131

UNITED STATES PATENT OFFICE 1,953,131

MAGNETO ROTOR

Curt F. Reis, Chicago, Ill.

Application April 25, 1931, Serial No. 532,933

5 Claims. (Cl. 171—252)

My invention relates to magnetos and particularly to rotor constructions for magnetos of the type comprising rotating permanent magnets and fixed generating units.

One purpose of my invention is to produce a magneto rotor made up of bar magnets which may be assembled between end plates without the magnets being machined. Such a construction can be made to operate with high efficiency and can be repaired in a simple manner, since the parts are readily separable.

More especially I desire to produce a rotor comprising two sets of flux supplying elements which may be assembled as a unit, each element being capable of cooperation with a separate generating unit so as to produce sparks for dual ignition purposes, and, at the same time provide for varying the intervals between sparks in accordance with operating conditions.

Other objects and purposes of the invention will appear from the following specification and by reference to the accompanying drawings, in which:

Figure 1 is a perspective view of one form of single rotor embodying my invention.

Figure 2 is a central vertical section of the rotor shown in Figure 1.

Figure 3 is a section on line 3—3 of Figure 2.

Figure 4 is a fragmentary sectional view of a modified end plate construction showing an alternative manner of securing it to the shaft.

Figure 5 is an elevation of the end plate of Figure 4 showing its relation to the magnets.

Figure 6 is a longitudinal section of a double rotor embodying my invention.

Figure 7 is a section on line 7—7 of Figure 6.

Figure 8 is a section on line 8—8 of Figure 6.

Figure 9:
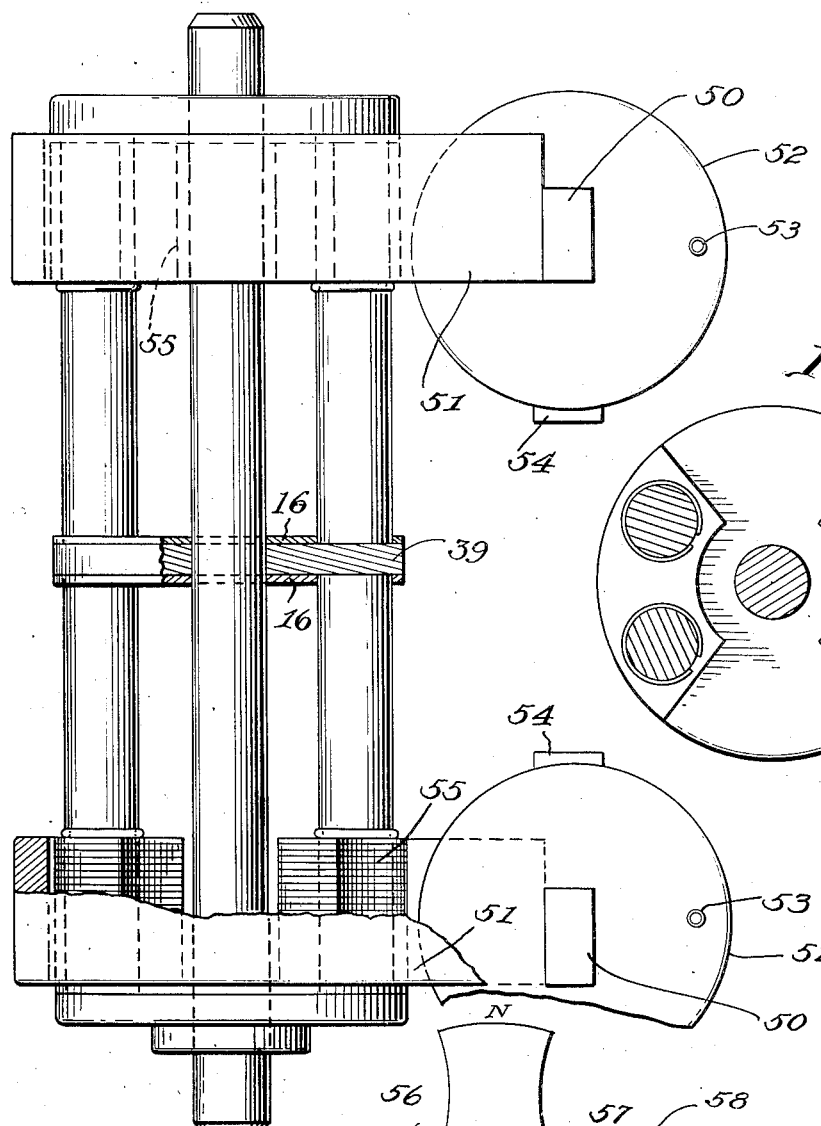
Figure 9 is an elevation showing my double rotor in assembled relation to two generating units.

Referring to Figure 1 of the drawings, the reference numeral 12 indicates an end plate composed of magnetic material and having integral shaft extensions 13 and 14, the extension 14 being internally threaded at 15. Secured to the face of plate 12, as by riveting, is a non-magnetic supporting plate 16 containing circumferentially spaced openings for the reception of the ends of bar magnets 17. As here shown, four of these magnets 17 are supported, at their ends remote from plate 12, by a second non-magnetic plate 16, secured to a non-magnetic end plate 18. End plate 18 has a central extension 19 containing an opening 20 to receive a stub shaft 21. This stub shaft is preferably of non-magnetic material and has the usual conical end 22 containing a key 23, while the opposed end is of reduced cross section and is threaded at 24 so as to cooperate with the threaded opening 15 of extension 14 on end plate 12.

When the parts are assembled with the magnets in contact with the end plates 12 and 18 and the supporting plates 16, the end 24 of shaft 21 is screwed into the extension 14 until the magnets and end plates are drawn into rigid fixed relation. A pin 25 may then be inserted through the extension 14 and shaft 21 to prevent the parts from working loose.

The end plate 12 is of magnetic material for conducting the flux between the unlike poles of magnets 17 which contact with it. End plate 18, however, is of non-magnetic material so as not to short circuit the ends of the magnets contacting with it. The ends of the magnets are provided with laminated pole shoes on their ends adjacent the plate 18. Two of the polar ends of like polarity carry pole shoes 26 and 26ª, while the two poles of the opposite polarity carry pole shoes 27 and 27ª. The construction of these pole shoes is clearly shown in Figures 1, 2 and 3 from which it appears that each of these pole pieces is made up of small laminated sections. These pole shoes contact with non-magnetic plate 16 at one end while the other end is held in place by split resilient rings 28 carried in shallow grooves in the magnets and positioned so as to hold the laminations of each shoe in closely contacting relation with one another.

The oppositely related pole shoes are held in place by bridging strips 29, which are also laminated and interlock with certain laminations of the pole shoes which they connect. For example, in Figure 3, the laminations of pole shoes 26 and 26ª contain slots in which projections 31 on the bridging strips are received, and keys 30 are driven into these slots for locking the parts together. The pole shoes 27 and 27ª are similarly connected by bridging strips 29, the two sets of bridging strips being spaced apart to prevent the unlike polar ends from being magnetically short circuited. The function of these bridging strips is to hold the parts in fixed unyielding relation by connecting like poles. Since these poles are of the same polarity and of substantially the same magnetic potential there is little flux flow between them. I find, however, that the magnetic field is strengthened by the addition of these strips and that the magnetic potentials of the various poles are more uniform with them than without them.

In Figures 1 and 2 I have shown the end plate 12 together with shaft extensions 13 and 14 as made integral but if the end plate 12 is to function as a cam, such a construction requires considerable machining. It is for this reason that I contemplate making the magnetic end plate in more than one piece, for example as shown in Figures 4 and 5. In these figures the shaft section and the end plate are shown as being made separately.

Referring now to Figure 4 the shaft section designated 32 has an integral flange 33 and a reduced end portion 34. The portion 32 contains a key 35 for securing it in driving relation to the end plate. This end plate is composed of plates 36 and 38 stamped from sheet metal and formed with cam lobes 37, here shown as four in number so as to operate a breaker four times during each shaft revolution. It is obvious that the number of cam lobes may be varied as desired. Permanently secured to plates 36 and 38 is a magnet supporting plate 16. The entire plate assembly is keyed to the shaft and the remainder of the rotor constructed as shown in Figures 1 and 2. In constructing a rotor with an end plate of this kind any type of cam may be used while the remainder of the assembly is standard and can be used with a variety of cam plates.

While I have shown my invention embodied in a single rotor in Figures 1 to 5, it may be applied to a double rotor and it is here that it finds its greatest use. A double rotor construction is shown in Figures 6 to 9.

Referring now to Figure 6, the construction there shown embodies all of the features described in connection with the rotor of Figures 1 to 3, but it is modified to provide a unitary structure of great efficiency and simplicity, and at the same time adapt it for dual ignition.

In Figure 6 the reference numeral 39 designates a magnetic center plate having permanently secured to it, on each face, a non-magnet supporting plate 16. The rotor here shown has four magnets as before but this is not essential and is shown merely by way of illustration. My construction is equally applicable to the use of two, four, six or more magnets on each side of the center plate 39.

The top end (as shown in Fig. 6) of the rotor comprises a non-magnetic end plate 40 having an integral shaft section 41, and bearing portion 42. A non-magnetic magnet supporting plate 16 is secured to this end plate as before and this plate receives the ends of magnets 17. The ends of magnets 17 adjacent the end plate 40 carry laminated pole shoes as in Figures 1 to 3, and they are assembled and secured together in the same manner. The other end of the double rotor comprises a second non-magnetic end plate designated 43, carrying a magnet supporting plate 16, and containing a central opening to receive stub shaft 44. This stub shaft has a threaded end 45 for cooperation with the internally threaded portion of shaft extension 41.

Stub shaft 44 has an enlargement 46 adjacent to the reduced drive end 48. When the rotor is assembled, as shown in Figure 6, the stub shaft passes through the opening in end plate 43 and through openings in the bridging strips of the pole shoes, also through the center plate 39. The stub shaft end 45 is screwed into extension 41 until all of the magnets are wedged tightly between the center plate 39 and the two end plates 40 and 43, because the two end plates are drawn inwardly. End plate 40 is drawn in because it is integral with extension 41 and end plate 43 because enlargement 46 on stub shaft 44 engages it. Figure 8 shows rivets 48' which secure magnet supporting plates 16 to center plate 39, and the relative positions of the magnets and this plate when assembled are thereby fixed. The reference character 49, in Figure 6, designates a bearing for the stub shaft 44, and the end 42 may be similarly equipped.

Although I have shown the end plates 40 and 43 in Figure 6, as made in one piece, it is obvious that they also may be made in two pieces as shown in Figure 4. By making both of the end plates 40 and 43 in the manner shown in Figures 4 and 5, two cams are provided thus making the rotor suitable for use in circuits where two circuit breakers are desirable. If only one breaker is to be used one of the cam plates may be omitted. Where two double end plates each including a cam are used, the parts may be assembled with any desired angular relation between the cam lobes, thus making it possible to produce sequential firing, first from one end of the rotor, then from the other. Although it will generally be found advisable in dual ignition circuits to have both sparks take at one time, it is possible with my double rotor to have one spark occur slightly in advance of the other in each cylinder to produce more perfect and uniform combustion.

The rotor of Figure 6 is adapted to use for dual ignition circuits. Such circuits are advantageous for use with internal combustion engines because they increase power, save fuel, and have the very great advantage that if one circuit fails the other may still function.

The double rotor is well adapted for use with two generating units which may be contained in a single housing. In Figure 9 I have shown one such arrangement where the reference numeral 50 designates coil bridges connecting field poles 51. These pole pieces may be laminated and furnish a path for flux flow between the magnet pole shoes and the coil bridges 50. Surrounding each of the bridges 50 is a generating coil 52 comprising primary and secondary windings. The connections to the primary winding are designated 53 while the secondary windings are designated 54. The details of the fields are not shown but it will be obvious that the members 51 have suitable polar projections in flux conducting relation to the rotor pole pieces and that the number of these projections may be varied in accordance with the number of sparks to be produced during each revolution of the rotor.

Figure 10:
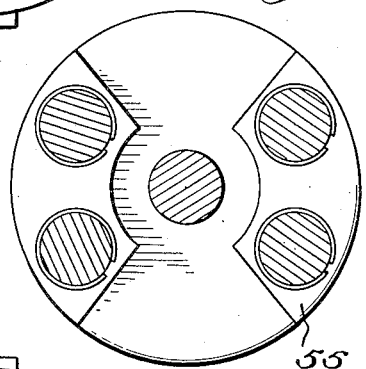
Figure 10 is a detail view illustrating one manner of adapting my rotor for use in a two-pole magneto.

The rotor has been illustrated as of multipolar construction but it may readily be adapted for use in a bipolar construction as shown in Figure 10. In this figure the like poles are arranged in pairs. The pole pairs are then each surrounded by pole shoes made up of laminations 55, so as to produce an ordinary bipolar field. The ends of the magnets remote from the polar laminations may be constructed as shown in Figures 1 and 2.

Figure 11:
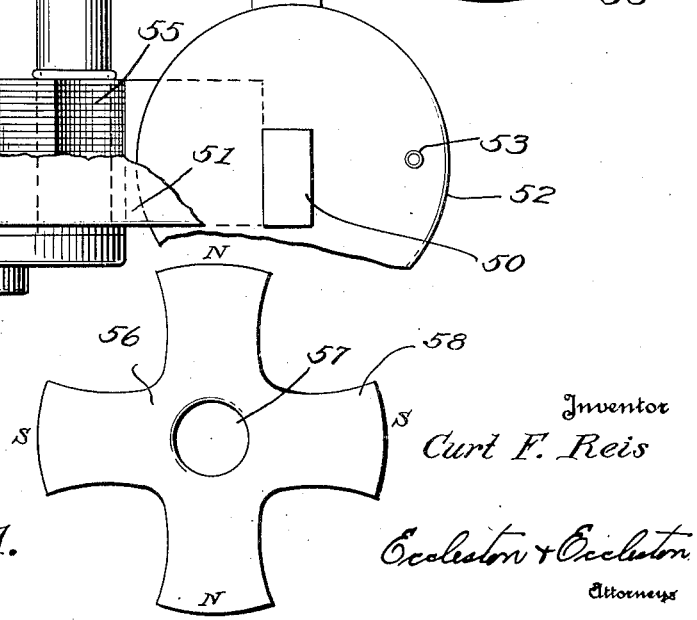
Figure 11 is a plan view of a modified form of end plate which may be used in place of the circular plates shown in the other figures.

In Figure 11 the reference numeral 56 indicates a modified form of end plate which may be adopted in any of the structures shown. It has a center shaft opening 57 and four radiating arms 58 which contact with the magnet ends. The advantage of this plate is that it reduces the weight of the parts without reducing the flux carrying capacity in cases where the end plates are of magnetic material. This form of plate is suitable for use as an end plate or center plate in the structures I have shown. A plate of this shape may of course be employed as a magnet supporting plate by providing suitable magnet receiving apertures in the arms 58.

Although I have herein shown and described only a few forms of magneto rotors embodying my invention, it will be obvious that changes may be made in the details, within the scope of the appended claims without departing from the spirit and scope of the invention.

Having fully described the invention, what I claim as new and desire to secure by Letters Patent is:

1. A rotor for a magneto of the rotating field type including two sets or groups of pole pieces, the groups being spaced endwise of the rotor, each pole piece consisting of a permanent magnet of bar type, a disc of magnetic material disposed intermediate the ends of the rotor and between adjacent ends of the magnet bars of the separate groups, means carried by the disc providing sockets on the opposite faces of the disc, receiving the ends of the magnet bars, a plate at each end of the rotor, and a screw-threaded connection between the end plates, arranged for drawing the plates toward each other, and clamping the magnetic disc between the inner adjacent ends of the magnet bars of the separate groups.

2. A rotor for a magneto of the rotating field type, including two groups of pole pieces, each pole piece consisting of a permanent bar magnet, the groups of pole pieces being arranged back to back with the pole pieces parallel to the rotor axis, a magnetic disc common to the two groups of pole pieces, disposed intermediate the ends of the rotor and between adjacent ends of the magnet bars of the separate groups, a plate secured to each opposite face of the disc and apertured so as to provide sockets for the ends of the bar magnets on each of the opposite faces of the disc, a plate near each outer end of the rotor, and a screw-threaded connection between the end plates for drawing the end plates toward each other and for clamping the magnet disc between the inner ends of the bar magnets.

3. In a rotor for a magneto of the rotating field type, a plurality of bar magnets arranged parallel to the rotor axis, a plurality of plates endwise engaging the magnets, auxiliary apertured elements secured to the magnet plates and providing sockets for the ends of the magnet bars, a two-part shaft structure extended through the rotor, the parts of the shaft having interfitting ends, arranged in socketed relation, and a locking element through the said shaft ends adapted to prevent relative rotation of the plates and shaft parts, and arranged to secure the bar magnets and plates in assembled relation, the interfitting ends of the shaft portions being disposed within the rotor and between the said end plates.

4. A rotor for a magneto of the rotating field type, including a plurality of permanent magnets of bar form arranged parallel to the rotor axis, a pair of plates endwise engaging the magnet bars, pole shoes carried by the magnet bars adjacent one of said plates, a shaft element extending through one of the said plates, and provided with a shoulder adjacent the plate through which it extends, another end plate having an inwardly projecting axial portion provided with a socket threadedly engaging the said shaft element for securing the plates and magnet bars in assembled relation, and provided with an outward axial extension constituting a stub shaft portion for rotatably mounting the rotor.

5. In a magneto of the rotating field type, adapted for dual ignition, a rotor including axially spaced groups of permanent magnets of bar type, a disc of magnetic material between and common to said groups, and endwise abutted by the magnet bars thereof, a plate engaging each of the opposite ends of the two groups of magnets, members secured to the disc and each of said plates, forming sockets for receiving the end portions of the several magnet bars, laminated pole shoes carried by each group of the bar magnets near the opposite ends of the rotor, means carried by the magnet bars for maintaining the shoes in assembled relation on the magnets, a shouldered shaft projecting through one of the end plates and through the central magnetic disc and provided with a threaded end, the opposite end plate provided with an internally threaded socket for receiving the threaded shaft end, an integral shaft-forming projection outwardly of the last said end plate, a pin extended through the threaded socket and shaft end for holding the said socket and shaft against angular displacement, and a pair of stationary inductor structures disposed externally of the rotor, each structure including laminated shoes embracing the rotor in spaced relation, a bridge interconnecting the corresponding shoes, and a coil carried by the bridge.

CURT F. REIS.